(12) United States Patent
Dingfelder et al.

(10) Patent No.: US 7,515,410 B1
(45) Date of Patent: Apr. 7, 2009

(54) HARD DISK DRIVE CARRIER CONVERTER APPARATUS

(75) Inventors: Donald W. Dingfelder, Winona, MN (US); Matthew C. Kueper, Pine Island, MN (US); David G. Lund, Byron, MN (US); Christopher L. Tuma, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/108,222

(22) Filed: Apr. 23, 2008

(51) Int. Cl.
H05K 5/00 (2006.01)
H05K 7/20 (2006.01)
H05K 7/16 (2006.01)
G06F 1/20 (2006.01)

(52) U.S. Cl. .................. 361/687; 361/685; 361/690; 361/727; 361/730; 454/184

(58) Field of Classification Search ............. 361/687, 361/685, 690, 727, 730; 454/184
See application file for complete search history.

(56) References Cited

U.S. PATENT DOCUMENTS

| | | | |
|---|---|---|---|
| 5,112,119 A * | 5/1992 | Cooke et al. ............... 312/283 |
| 5,652,695 A * | 7/1997 | Schmitt ...................... 361/685 |
| 5,694,290 A * | 12/1997 | Chang ........................ 361/685 |
| 5,912,799 A * | 6/1999 | Grouell et al. ............. 361/685 |
| 6,122,165 A * | 9/2000 | Schmitt et al. ............. 361/685 |
| 6,201,692 B1 * | 3/2001 | Gamble et al. ............. 361/685 |
| 6,473,297 B1 * | 10/2002 | Behl et al. .................. 361/685 |
| 6,483,107 B1 * | 11/2002 | Rabinovitz et al. ......... 250/239 |
| 6,560,098 B1 * | 5/2003 | Beinor et al. ............... 361/685 |
| 6,876,547 B2 * | 4/2005 | McAlister ................... 361/685 |
| 6,882,525 B2 | 4/2005 | Paul et al. |
| 6,900,387 B2 * | 5/2005 | Gravell et al. .............. 174/50 |
| 6,982,872 B2 * | 1/2006 | Behl et al. .................. 361/687 |
| 7,012,805 B2 | 3/2006 | Shah et al. |
| 7,031,153 B2 * | 4/2006 | Tanaka et al. .............. 361/687 |
| 7,035,097 B2 * | 4/2006 | Petrov et al. ............... 361/685 |
| 7,079,387 B2 | 7/2006 | Brooks et al. |
| 7,088,579 B1 * | 8/2006 | Konshak ..................... 361/685 |
| 7,112,131 B2 * | 9/2006 | Rasmussen et al. ......... 454/184 |
| 7,190,575 B1 * | 3/2007 | Baik et al. .................. 361/685 |
| 7,215,506 B2 * | 5/2007 | Albrecht et al. .......... 360/97.01 |
| 7,251,132 B1 * | 7/2007 | Paul et al. .................. 361/685 |
| 7,321,489 B2 * | 1/2008 | McAlister ................... 361/685 |
| 7,388,749 B1 * | 6/2008 | Feroli et al. ................ 361/704 |
| 2004/0038641 A1 * | 2/2004 | Kawano et al. ............. 454/237 |

(Continued)

*Primary Examiner*—Jayprakash N Gandhi
*Assistant Examiner*—Bradley H Thomas
(74) *Attorney, Agent, or Firm*—Cantor Colburn LLP

(57) ABSTRACT

A system is provided and includes a system chassis through which an airflow is defined, including a set of receiving units, a set of 3.5" HDDs, each being disposed in a receiving unit of a portion of the set, and each having a profile that blocks a first quantity of the airflow, a set of 2.5" HDDs, each being disposed in a receiving unit of a remaining portion of the set, and each having a profile that blocks a second quantity of the airflow, and a set of airflow blockage devices, each being respectively disposed within each of the receiving units of the remaining portion of the set, to each have a cavity defined therein in which the corresponding 2.5" HDD is secured with a third quantity of the airflow traversing a surface thereof and a profile that blocks a fourth quantity of the airflow through the corresponding receiving unit.

1 Claim, 3 Drawing Sheets

U.S. PATENT DOCUMENTS

| | | | |
|---|---|---|---|
| 2004/0085722 A1* | 5/2004 | Tanzer et al. | 361/683 |
| 2005/0111136 A1* | 5/2005 | Miyamoto et al. | 360/97.03 |
| 2006/0039108 A1* | 2/2006 | Chikusa et al. | 361/695 |
| 2006/0048001 A1* | 3/2006 | Honda et al. | 714/7 |
| 2006/0120192 A1* | 6/2006 | Miyamoto et al. | 365/221 |
| 2006/0126210 A1* | 6/2006 | Katakura et al. | 360/69 |
| 2006/0227505 A1* | 10/2006 | Miyamoto | 361/695 |
| 2006/0276121 A1* | 12/2006 | Rasmussen | 454/184 |
| 2007/0025076 A1* | 2/2007 | Matsushima et al. | 361/687 |

* cited by examiner

HARD DISK DRIVE CARRIER CONVERTER APPARATUS

BACKGROUND OF THE INVENTION

1. Field of the Invention

Aspects of the present invention relate to a hard disk drive (HDD) carrier converter apparatus and, more particularly, to a HDD carrier converter apparatus in which 2.5" and 3.5" HDDs cohabitate.

2. Description of the Background

Currently, hard disk drive (HDD) technology is moving from 3.5" standard sized drives (3.5" HDDs) to 2.5" standard sized drives (2.5" HDDs). As such, since there are a significant number of machines in the field that have bays that are designed to receive 3.5" HDDs, it is useful to be able to plug the 2.5" HDDs into bays of those already operating machines.

The process of plugging 2.5" HDDs into bays designed for 3.5" HDDs presents certain problems. Among these is the need to maintain a substantially uniform airflow through each of the bays of a single machine. However, since 2.5" HDDs have different profiles from 3.5" HDDs, a machine having bays into which both types of HDDs are plugged will tend to produce a non-uniform airflow. In this case, some of the HDDs may not be properly cooled and, consequently, may not operate properly.

SUMMARY OF THE INVENTION

In accordance with an aspect of the invention, a system in which a set of hard disk drive (HDD) carrier converter apparatuses are installed for use in a computing environment having components installed therein is provided and includes a system chassis through which an airflow is defined, including a set of receiving units: that are each configured to receive a 3.5" HDD and which are arrayed in a planar format formed perpendicular with respect to a direction of the airflow, a set of 3.5" HDDs, each being respectively accessible by the components, each being disposed in a receiving unit of a portion of the set thereof, and each having a profile that blocks a first quantity of the airflow through the corresponding receiving unit, a set of 2.5" HDDs, each being respectively accessible by the components, each being disposed in a receiving unit of a remaining portion of the set thereof, and each having a profile that blocks a second quantity of the airflow through the corresponding receiving unit, and a set of airflow blockage devices respectively disposed within each of the receiving units of the remaining portion of the set thereof, each of which includes a respective one of the carrier converter apparatuses, wherein each of the carrier converter apparatuses includes a cover to cover a corresponding 2.5" HDD, and a structure to define a cavity therein in which the corresponding 2.5" HDD is secured at a predetermined distance from the cover such that a third quantity of the airflow traverses a top surface of the secured 2.5" HDD between the cover and the top surface, the structure including a rib section disposed adjacent to the secured 2.5" HDD, wherein each of the carrier converter apparatuses forms a profile, which blocks a fourth quantity of the airflow through the corresponding receiving unit, of at least the profile of the secured 2.5" HDD, a profile of the cover and a profile of the structure including the rib section, and wherein the second and fourth quantities of the airflow are substantially equal to the first quantity of the airflow.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

The subject matter which is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

DETAILED DESCRIPTION OF THE INVENTION

Figure 1A:
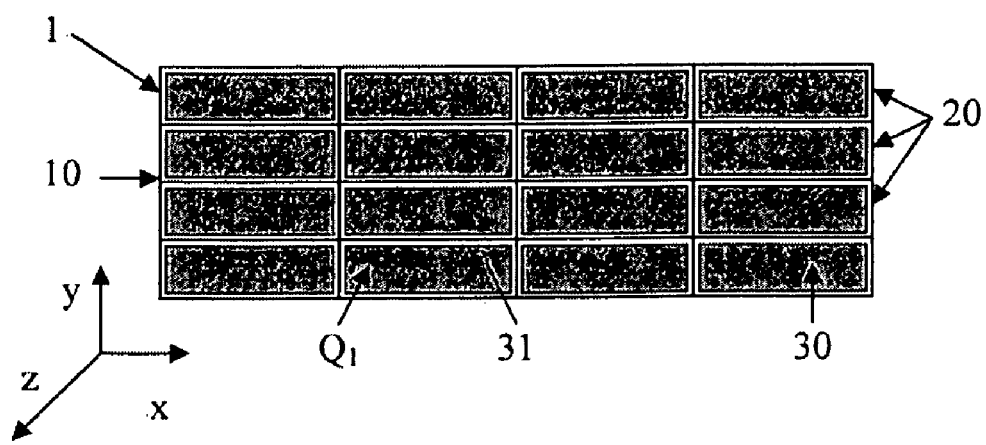
FIGS. 1A, 1B and 1C are schematic views of an elevation of a hard disk drive (HDD) carrier converter apparatus in accordance with an embodiment of the invention.
Figure 1B:
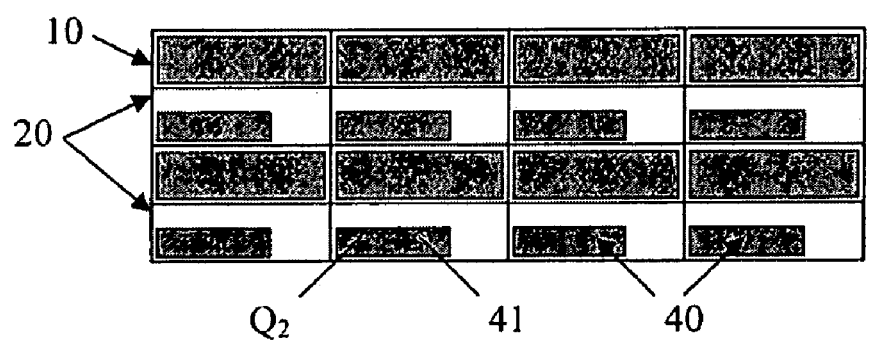
Figure 1C:
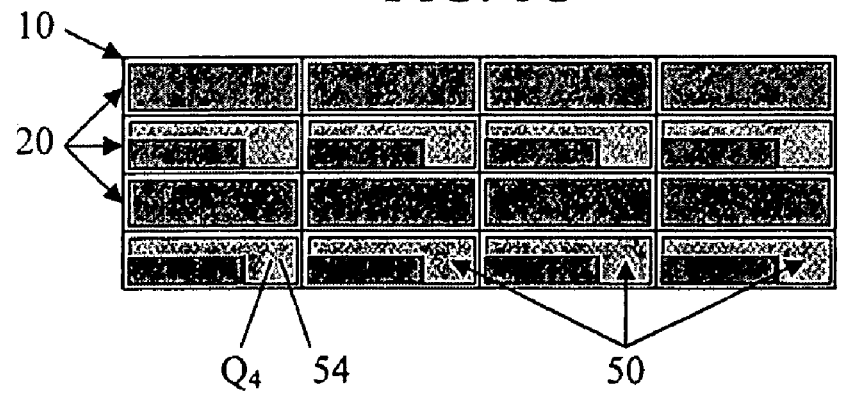
Figure 2:
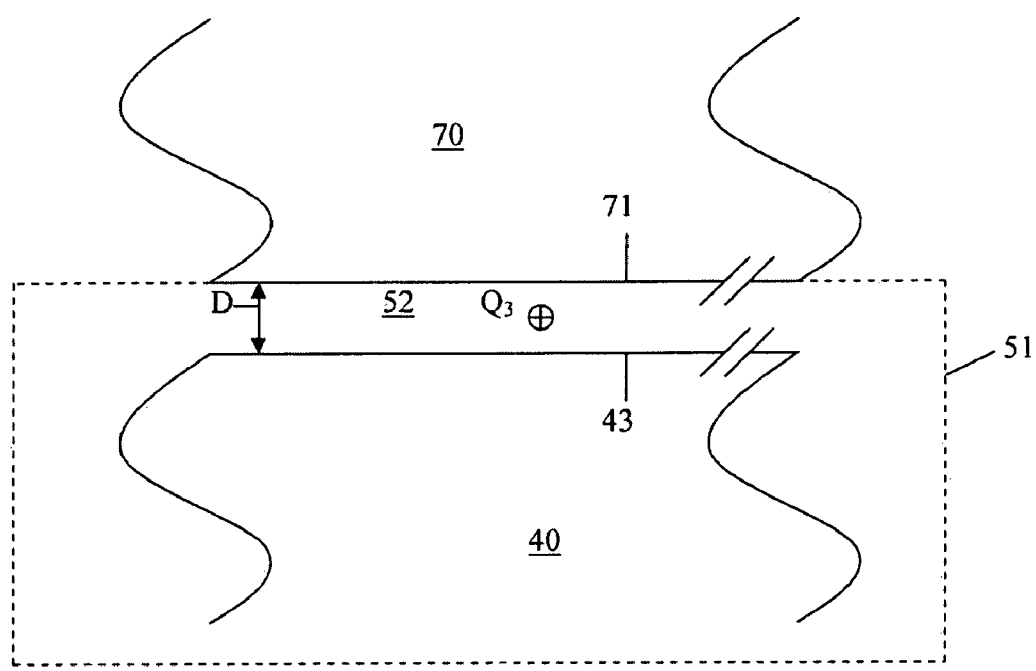
FIG. 2 is an exploded view of an aperture of FIG. 1C.

With reference to FIGS. 1A, 1B, 1C, 2 and 3, a system 1 in which a set of hard disk drive (HDD) carrier converter apparatuses are installed is provided for use in a computing environment having components installed therein. The system 1 includes a system chassis 10 through which an airflow A (see the arrow of FIG. 3) travels. The system chassis 10 includes a set of receiving units 20 that are each configured to receive a 3.5" HDD 30, or some other smaller device, therein and which are arrayed in a planar format. The planar format of the array of the receiving units 20 is formed in parallel with axes x and y and perpendicularly with respect to axis z, which is parallel with a predominant traveling direction of the airflow A.

A set of 3.5" HDDs 30 are each disposed within a single receiving unit 20 of at least a portion of the set of the receiving units 20. Each 3.5" HDD 30 is therefore positioned to be accessed by the components installed in the computing environment. Additionally, each of the 3.5" HDDs 30 has a profile 31, within the x-y plane, with a size and a shape that is sufficient to block a first quantity $Q_1$ of the airflow A traveling through the corresponding single receiving unit 20.

A set of 2.5" HDDs 40 are each disposed with a single receiving unit 20 of a remaining portion of the set of the receiving units 20. Each of the 2.5" HDDs 40 is therefore positioned to be respectively accessed by the components installed in the computing environment. Additionally, each of the 2.5" HDDs 40 has a top surface 43 and a profile 41, within the x-y plane and perpendicular to the top surface 43, with a size and a shape that is sufficient to block a second quantity $Q_2$ of the airflow A traveling through the corresponding single receiving unit 20.

A set of airflow blockage devices 50, or air dams, are each respectively disposed within each of the single receiving units 20 of the remaining portion of the set of the receiving units 20. Each of the airflow blockage devices 50 includes a carrier converter apparatus 100 having a structure 101 including a rib section 65 and in which a cavity 51 (see FIGS. 2 and 3) is defined. A corresponding one of the 2.5" HDDs 40 is structurally secured by screws 45 to the structure 101 within the cavity 51 with the rib section 65 disposed adjacent thereto in the x-y plane. The cavity 51 of each of the airflow blockage devices 50 is sufficiently large so as to form an aperture 52 that is aligned with the top surface 43 of the corresponding 2.5" HDD 40. A third quantity $Q_3$ of the airflow A is permitted to travel through the aperture 52 and to thereby flow between the top surface 43, as a coolant for the corresponding 2.5"

HDD 40, and a cover 70, which is positioned to cover the secured 2.5" HDD 40 at a predetermined distance, D.

Each of the carrier converter apparatuses 100 of the airflow blockage devices 50 also has a profile 54, within the x-y plane, with a size and a shape that is sufficient to block a fourth quantity $Q_4$ of the airflow A that travels through the corresponding single receiving unit 20. The profile 54 is formed of, at least, a profile of the secured 2.5" HDD 40 within the x-y plane, a profile of the structure 101 of the carrier converter apparatus 100 within the x-y plane, a profile of the cover 70 to cover the secured 2.5" HDD 40 within the x-y plane, and a profile of the rib section 65, which is disposed adjacent to the secured 2.5" HDD 40, within the x-y plane.

A sum of the quantities $Q_2$ and $Q_4$ of the airflow A is substantially equal to the first quantity $Q_1$ of the airflow A. Thus, an amount of the airflow A traveling through a particular receiving unit 20 that has a 3.5" HDD 30 disposed therein is substantially equal to an amount of the airflow A traveling through a particular receiving unit 20 that has a combined 2.5" HDD 40 and an airflow blockage device 50 disposed therein. Moreover, in embodiments of the invention in which the receiving units 20 of a system chassis 10 are all occupied by 3.5" HDDs 30 and combinations of 2.5" HDDs 40 with airflow blockage devices 50, the airflow A traveling through the system chassis 10 is maintained uniformly and coolant is provided for each disk drive.

Figure 3:
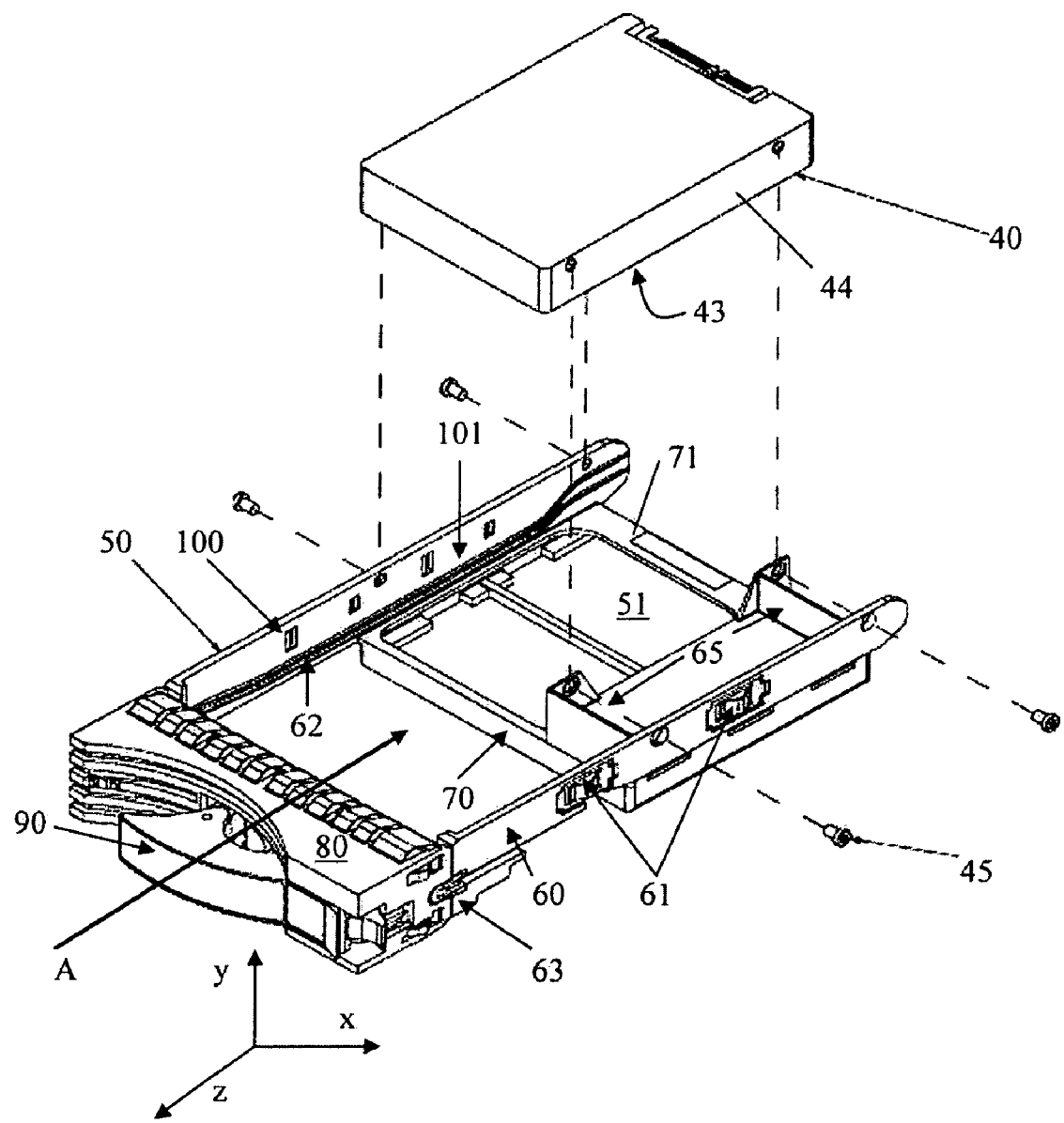
FIG. 3 is a perspective view of a schematic drawing of an airflow blockage device for use in the HDD carrier converter apparatus of FIGS. 1A, 1B and 1C.

With reference to FIG. 3, each airflow blockage device 50 includes a bezel 80, having a latch 90 operably connected thereto, by which the airflow blockage device 50 and a corresponding 2.5" HDD 40 is installed in a receiving unit 20 of the system chassis 10 by an operator. Legs 60 are connected to rear portions of opposing sides of the bezel 80 and have respective distal ends that bracket both the 2.5" HDD 40 and the rib section 65, which is disposed adjacent to a side surface 44 of the 2.5" HDD 40. The cover 70 covers the top surface 43 of the 2.5" HDD 40 as well as a top surface of the rib section 65. The aperture 52 is, therefore, defined between the top surface 43 of the 2.5" HDD 40 and a lower surface 71 of the cover 70. The screws 45 secure the 2.5" HDD 40 to the respective distal ends of the legs 60.

According to embodiments of the invention, the bezel 80 is configured to prevent signals having certain frequencies from escaping to an exterior of the computing environment in accordance with FCC regulations. The legs 60 may include vibration dampers 61, light pipes 62 along which an LED signal is transmitted, and a key 63 to identify a type of disk drive being inserted into the system chassis 10. Many of the various features of the airflow blockage device 50 may be formed of a die cast aluminum that has vibration resistant characteristics while a surface of the cover 70 may be formed of a clear or an opaque plastic on which bar codes may be imprinted.

Of course, it is understood that not all of the receiving units 20 of the system chassis 10 will contain a 3.5" HDD 30 or a combination of a 2.5" HDDs 40 with an airflow blockage device 50. Indeed, some will be empty and others will hold other types of devices. In the case of an empty receiving unit 40, a first type of a modified airflow blockage device 50 will be employed to block a quantity of the airflow A through the empty receiving unit 20 which is substantially equal to the first quantity $Q_1$ of the airflow A. Similarly, in the case of a receiving unit 20 containing another type of device, a second type of a modified airflow blockage device 50 will be employed to block a quantity of the airflow A which is not blocked by the device such that the total quantity of the blocked airflow A through the corresponding receiving unit 20 is substantially equal to the first quantity $Q_1$.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A system in which a set of hard disk drive (HDD) carrier converter apparatuses are installed for use in a computing environment having components installed therein, the system comprising:

a system chassis through which an airflow is defined, including a set of receiving units that are each configured to receive a 3.5" HDD and which are arrayed in a planar format formed perpendicular with respect to a direction of the airflow;

a set of 3.5" HDDs, each being respectively accessible by the components, each being disposed in a receiving unit of a portion of the set thereof, and each having a profile that blocks a first quantity of the airflow through the corresponding receiving unit;

a set of 2.5" HDDs, each being respectively accessible by the components, each being disposed in a receiving unit of a remaining portion of the set thereof, and each having a profile that blocks a second quantity of the airflow through the corresponding receiving unit; and a set of airflow blockage devices, respectively disposed within each of the receiving units of the remaining portion of the set thereof, each of which includes a respective one of the carrier converter apparatuses, wherein each of the carrier converter apparatuses includes a cover to cover a top surface of a corresponding 2.5" HDD, a plane of the top surface being parallel with the direction of the airflow, and a structure to define a cavity therein in which the corresponding 2.5" HDD is secured with the top surface of the 2.5" HDD separated by a predetermined distance from lower surfaces of the cover such that a third quantity of the airflow traverses, in a direction that is parallel with the direction of the airflow, the top surface of the 2.5" HDD between the lower surfaces of the cover and the top surface of the 2.5" HDD, the structure including a single rib section disposed adjacent to one side of the 2.5" HDD, which has a thickness that is greater than that of the 2.5" HDD in a direction that is perpendicular to the direction of the third quantity of the airflow, and which has a top surface that abuts the lower surfaces of the cover, wherein each of the carrier converter apparatuses forms a profile, which blocks a fourth quantity of the airflow through the corresponding receiving unit, of at least a profile of the cover and a profile of the structure including the rib section, and wherein a sum of the second and fourth quantities of the airflow exceed the first quantity of the airflow by an amount substantially equal to the third quantity of the airflow.

* * * * *